United States Patent [19]

Ushiro

[11] 4,408,239

[45] Oct. 4, 1983

[54] ROTARY MAGNETIC HEAD DRUM ASSEMBLY FOR MAGNETICALLY RECORDING AND/OR REPRODUCING DEVICE

[75] Inventor: Tatsuzo Ushiro, Tokyo, Japan

[73] Assignee: Canon Kabushiki Kaisha, Tokyo, Japan

[21] Appl. No.: 272,543

[22] Filed: Jun. 11, 1981

[30] Foreign Application Priority Data

Jun. 12, 1980 [JP]  Japan .................................. 55-79258

[51] Int. Cl.³ .......................... G11B 5/52; G11B 15/60
[52] U.S. Cl. ....................................... 360/107; 360/84
[58] Field of Search ....................... 360/107, 108–109, 360/84–85, 130.24; 310/67 R, 68 D

[56] References Cited

U.S. PATENT DOCUMENTS

| | | | |
|---|---|---|---|
| 3,867,725 | 2/1975 | Janssen et al. | 360/107 |
| 4,058,845 | 11/1977 | Zahn | 360/107 |
| 4,251,840 | 2/1981 | Maruyama et al. | 360/107 |
| 4,354,211 | 10/1982 | Gilovich et al. | 360/84 |

Primary Examiner—Alfred H. Eddleman
Attorney, Agent, or Firm—Toren, McGeady and Stanger

[57] ABSTRACT

A rotary magnetic head drum assembly which is formed smaller, thinner and yet is adapted to operate accurately and wherein, without employing a rotatable spindle for a rotary head drum, the drum is directly and rotatably supported on a stationary drum provided under the head drum, through bearings provided at its peripheral groove. A rotary transformer is disposed between the outer side face of the rotary head drum and the inner side face of the stationary drum to transmit video signals from the rotary magnetic heads to the outer circuitry or vice versa.

13 Claims, 3 Drawing Figures

ROTARY MAGNETIC HEAD DRUM ASSEMBLY FOR MAGNETICALLY RECORDING AND/OR REPRODUCING DEVICE

BACKGROUND OF THE INVENTION

1. Field of the Invention

This invention relates to a rotary magnetic head drum assembly for a helical scanning type magnetic recording-reproducing device, particularly designed so that the axial dimension of the rotary head drum assembly is as small as possible.

2. Description of the Prior Art

FIG. 1 shows an example of the conventional magnetic head drum assembly in section. In case of the conventional head drum assembly, as is shown in FIG. 1, the rotary head drum 1 is borne on the rotation axle 12 by means of ball bearings 6 and 7 in such a manner that the rotary head drum assembly 1 is arranged above the bearings, while the driving rotary magnet 8 is arranged beneath the bearings. A support member 3 for the primary coil 4 of a rotary transformer is arranged at the side of the rotary drum, while a secondary coil 5 of the rotary transformer is arranged at the side of the stationary drum. Further, beneath the bearings the rotary magnet 8 is arranged at the side of the rotary drum by means of a support member 11, while in order to drive the magnet 8 in rotation a stator 9 and a stator coil 10 are arranged at the side of the stationary drum. 14 is a magnetic head arranged on the rotary drum 1 by means of the base plate 13, the output of which head is connected to the primary coil 4 of the rotary drum by means of a conductor (not shown) so as to be electromagnetically coupled with the stationary transformer (the secondary coil). The recording-reproducing magnetic tape runs slanted along the surface of the rotary drum and the stationary drum in such a manner that during scanning with the rotary head the track is formed slanted on the surface of the tape.

In case of the conventional drum assembly as is shown in FIG. 1, because the rotary drum is mounted on the rotation axis and the bearings 6 and 7 exist between the stationary drum and the rotary drum, it is difficult to obtain a rotation with high accuracy when the distance between the bearings is small and it is thus difficult to realize a drum assembly which is thin along the axial direction, which is disadvantageous.

SUMMARY OF THE INVENTION

It is accordingly an object of the present invention to provide an improved rotary magnetic head drum assembly for a magnetically recording and/or reproducing device which obviates the disadvantages of prior art devices.

It is another object of the present invention to provide a rotary magnetic head drum assembly for a magnetically recording and/or reproducing device, wherein the bearing method of the rotary drum is improved so as to realize a thin device.

It is yet another object of the present invention to provide a head drum assembly for a magnetically recording and/or reproducing tape device, wherein the rotary drum having the magnetic head is borne directly with the bearing so as to eliminate the rotation axis, while further inside of the bearings a pick-up part of the signal from the magnetic head is provided so as to realize a thin drum assembly in order to obtain high accuracy.

These and further objects and features of the present invention will become apparent from the following detailed description of embodiments thereof taken in connection with the accompanying drawings.

DESCRIPTION OF THE PREFERRED EMBODIMENTS

Figure 1:
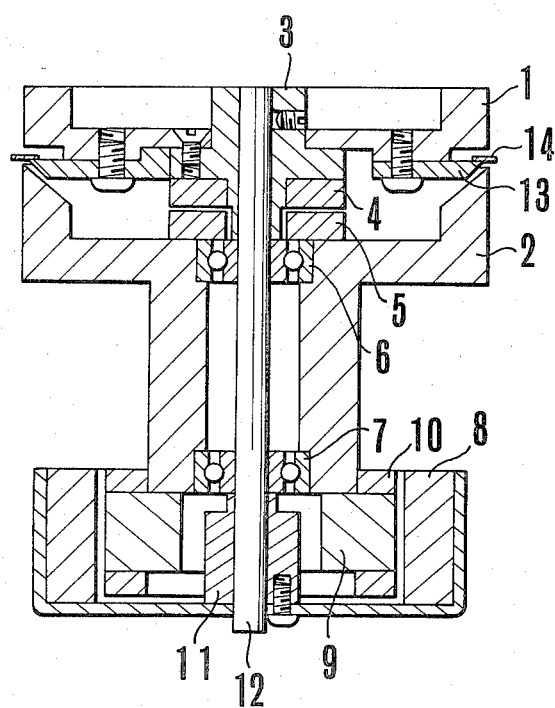
FIG. 1 shows an example of the conventional rotary head assembly in section.
Figure 2:
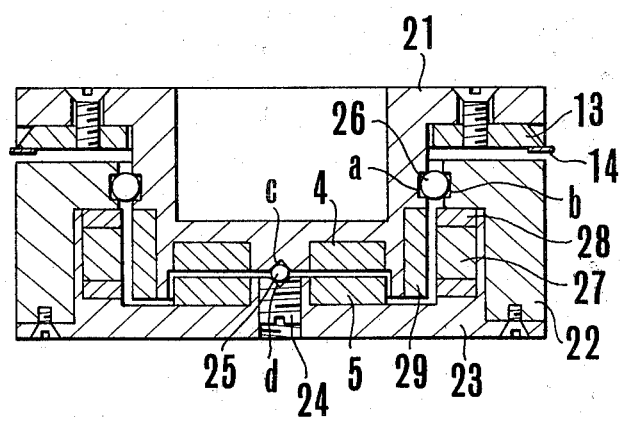
FIG. 2 shows an embodiment of the rotary head according to the present invention in section.

FIG. 2 shows an embodiment of the head drum assembly of the present invention in section. As is shown in the drawing, the rotary drum 21 is engaged in the stationary drum 22, whereby the ring grooves a and b are provided at the engaging portions so as to face to each other and contain steel balls 26 in order to support the rotary drum 21. In the stationary drum 22, the support member 23 having the stationary part 5 of the rotary transformer, the stator 27 and the stator coil 28 are engaged, whereby the rotary drum 21 is driven in rotation by means of the rotary magnet 29 provided on the rotary drum 21, the stator 27 and the stator coil 28. The magnetic head 14 is mounted on the rotary drum 21 together with the base plate 13 in order to receive the signal from the magnetic head 14 or to transfer the signal to the magnetic head 14 by means of the rotary portion 4 of the rotary transformer arranged on the rotary drum 21 and the stationary portion 5 of the rotary transformer arranged on the stationary drum. Further, in the threaded bore provided in the center of the above-mentioned support member 23 the screw 24 is engaged, while a steel ball 25 is brought into contact with the groove provided at the rotation center of the rotary drum by means of a groove C provided at the end of the screw so as to eliminate the vertical play of the rotation surface. By means of the above-mentioned construction, the surface accuracy of the rotary drum is determined by means of the drum support portions a, b, c and d and the steel balls 25 and 26 in such a manner that in comparison with the conventional device shown in FIG. 1, the number of the parts in need of high accuracy is remarkably decreased. Further, because the support portions are arranged on a large radius on the rotation surface, the distance between the portions can be made very small. Also, because the rotation center is a hole bore the drum assembly can be made very thin by arranging the rotation transformer 4 and the stationary transformer in the bore.

It goes without saying that the drum support portions a, b, c and d can be constituted with separate members, in which the rotary drum and the stationary drum are engaged.

Figure 3:
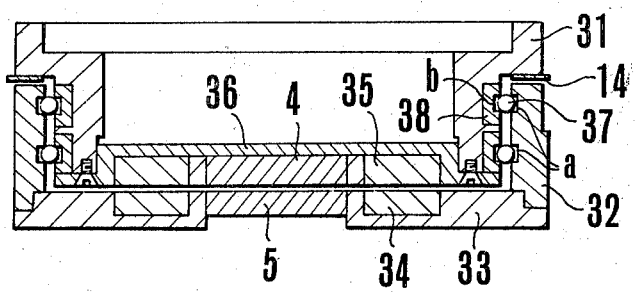
FIG. 3 shows another embodiment of the present invention in section.

FIG. 3 shows another embodiment of the invention in section. In case of the device shown in the drawing, on the internal circumference of the stationary drum 32 two ring grooves a are provided, with ring members 38 having ring grooves b being provided at the positions corresponding to those of the rotary drum 31, whereby steel balls 37 are inserted between the grooves a and b in such a manner that the rotary drum 31 is engaged in the ring members 38 so as to be supported. The magnetic head 14 is arranged on the rotary drum 31. Beneath the rotary drum, the rotary portion 4 of the rotary transformer and the support member 36 for the rotary magnet 35 are arranged, while beneath the stationary drum 32 the stationary portion 5 of the rotary transformer and the support member 33 for the stator coil 34 are arranged in such a manner that the rotary drum 31 is driven in rotation by means of the rotary magnet 35 and the stator coil 34 so that the signal from the magnetic head 14 is transferred to the rotary transformer 4 and the stationary transformer 5. By means of the above construction, the surface accuracy of the rotary drum is determined with the support portions a and b so that in comparison with the conventional device, the number of the parts in need of high accuracy is significantly decreased. Further, because the support portions are arranged at a large radius on the rotation surface, it becomes very easy to increase the accuracy, while at the same time it is possible to arrange the rotary transformer 4, the stationary transformer 5 and the driving part in the space at the center of the drum in such a manner that the thickness of the drum along the vertical direction to the rotation surface is the distance between the part above the mounting surface of the magnetic head 14 on the rotary drum 31 and the support porions a and b, which enables the realization of a very thin drum assembly.

It goes without saying that the support portion a may be constituted as a separate member engaged in the stationary drum 32.

As explained above, in the case of the rotary assembly for the magnetic recording and/or reproducing device according to the invention, the rotary drum is supported along the internal surface of a cylinder relatively close to the external circumference of the stationary drum by means of balls and ring grooves, so as to enable the rotation of the rotary drum without requiring a rotation axle so that the dimension of the device along the axial direction can be made extraordinarily small while stabilized rotation with high accuracy is made possible, whereby because there is no rotation axle the member for receiving or transferring the signal from the head or to the head can be arranged in the space at the center. This is quite effective for the construction of the rotary head of a compact VTR and so on.

While specific embodiments of the invention have been shown and described in detail to illustrate the application of the inventive principles, it will be understood that the invention may be embodied otherwise without departing from such principles.

What is claimed is:

1. A rotary magnetic head drum assembly for a helical scanning type magnetically recording and/or reproducing device comprising a rotary drum having a magnetic head on the circumference and a driving part at the part inside of the circumference and a stationary drum having a driving coil arranged so as to face to the driving part and a circumference whose diameter is almost the same as that of the circumference of the rotary drum, wherein on the circumferential surface of a cylinder whose diameter is smaller than that of the circumference of the rotary drum at least one ring groove is provided, while in a space between the ring groove and that provided on the internal circumference of the cylinder of the stationary drum so as to face to the former ring groove a plurality of steel balls are inserted so as to constitute a bearing, by means of which the rotary drum is freely rotatable.

2. A rotary magnetic head drum assembly for a magnetically recording and/or reproducing device according to claim 1 wherein a rotary disc and a stationary disc close to the rotation center of the rotary drum and the stationary drum are respectively provided with a rotary coil and a stationary coil so as to constitute a transformer, by means of which a signal is received from the rotary magnetic head or transferred to the head.

3. A rotary magnetic head drum assembly for a magnetically recording and/or reproducing device comprising:
  a magnetic head for transferring information signals;
  a rotary drum including a first outer peripheral surface provided with said magnetic head and a rotary peripheral surface whose diameter is smaller than that of said first outer peripheral surface;
  a stationary drum including a second outer peripheral surface aligned adjacently with said first outer peripheral surface of said rotary drum and a stationary peripheral surface arranged opposite to said rotary peripheral surface; and
  connecting means for coupling said rotary drum and said stationary drum, said connecting means including a connecting medium disposed between said rotary peripheral surface and said stationary peripheral surface, and a portion arranged at least at one of said rotary peripheral surface and said stationary peripheral surface for guiding said connection medium.

4. A rotary magnetic head drum assembly for a magnetically recording and/or reproducing device comprising:
  a magnetic head for transferring information signals by means of magnetic tape;
  a rotary drum including a first outer peripheral surface provided with said magnetic head, a rotary peripheral surface whose diameter is smaller than that of said first outer peripheral surface and a rotatably driven portion at said rotary peripheral surface;
  a stationary drum including a second outer peripheral surface substantially flush with said first outer peripheral surface of said rotary drum, a stationary peripheral surface arranged opposite to said rotary peripheral surface and driving means for providing a magnetic field to said rotatably driven portion so as to rotate said rotary drum; and
  rotatably connecting means for coupling said rotary drum and stationary drum, said connecting means including a connecting medium disposed between said rotary peripheral surface and said stationary peripheral surface, and a portion arranged at least at one of said rotary peripheral surfaces and said stationary peripheral surface for guiding said connecting medium.

5. A rotary magnetic head drum assembly for a magnetically recording and/or reproducing device comprising:
  a rotary drum including a first cylinder which is provided with a magnetic head and a second cylinder whose diameter is smaller than that of said first cylinder;
  a stationary drum arranged coaxially with said rotary drum and including an outer peripheral surface adjacent to a first outer peripheral surface determined by said first cylinder and an inner peripheral surface arranged opposite to a second outer peripheral surface determined by said second cylinder; and coupling means for rotatably coupling said rotary drum with said stationary drum, said coupling means including a connecting medium disposed between said second outer peripheral surface of said second cylinder and said inner peripheral surface of said stationary drum and a portion arranged at least at one of said second outer peripheral surface and said inner peripheral surface for guiding said connecting medium.

6. A rotary magnetic head drum assembly for a magnetically recording and/or reproducing device comprising:

a rotary drum including a first cylinder which is provided with a magnetic head and a second cylinder whose diameter is smaller than that of said first cylinder;

a stationary drum arranged coaxially with said rotary drum and including an outer peripheral surface substantially flush with a first outer peripheral surface determined by said first cylinder and an inner peripheral surface arranged opposite to a second outer peripheral surface determined by said second cylinder;

coupling means for rotatably coupling said rotary drum with said stationary drum, said coupling means including a connecting medium disposed between said second outer peripheral surface of said second cylinder and said inner peripheral surface of said stationary drum and a portion arranged at least at one of said second outer peripheral surface and said inner peripheral surface for guiding said connecting medium; and driving means for rotating said rotary drum, said driving means including a rotatably driven portion arranged in said second outer peripheral surface and a driving portion arranged in said inner peripheral surface so as to face to said driven portion.

7. A rotary magnetic head drum assembly for a magnetically recording and/or reproducing device comprising:

a magnetic head for transferring information signals by means of magnetic tape;

a rotary drum including a first cylinder portion determining a first outer peripheral surface and a second cylinder portion determining a second outer peripheral surface;

said second cylinder portion being different from said first cylinder portion in diameter;

said magnetic head arranged adjacent to said first outer peripheral surface;

a stationary drum arranged under and coaxially with said rotary drum and including an outer peripheral surface substantially flush with said first outer peripheral surface of said rotary drum and an inner peripheral surface arranged opposite to said second outer peripheral surface of said rotary drum; said rotary drum further including a rotatably driven portion arranged in an outer surface other than said first outer peripheral surface of said rotary drum;

said stationary drum further including driving means for providing a magnetic field to said rotatably driven portion so as to rotate said rotary drum, said driving means being arranged so as to face with said rotatably driven portion; and means for rotatably connecting said rotary drum to said stationary drum, said connecting means including a connecting medium disposed between said second outer peripheral surface and said inner peripheral surface and a portion arranged at least at one of said second outer peripheral surface and said inner peripheral surface for guiding said connecting medium.

8. A rotary device, comprising:

first cylindrical means including first and second cylindrical parts each having an outer circumferential surface, the diameter of said second part being smaller than that of said first part;

second cylindrical means coaxial with said first cylindrical means and having outer and inner circumferential surfaces, the outer diameter of said second cylindrical means being substantially equal to that of said first part of said first cylindrical means and the inner diameter of said second cylindrical means being larger than that of said second part of said first cylindrical means so as to form space for receiving therein said second part of said first cylindrical means; and ensuring means for ensuring smooth relative rotation between said first and second cylindrical means, said ensuring means being arranged between said inner surface of said second cylindrical means and said outer surface of said second part of said first cylindrical means.

9. A device according to claim 8 wherein said first cylindrical means further includes a plane surface and said second cylindrical means further includes a plane surface arranged opposite to said plane surface of said first cylindrical means.

10. A device according to claim 9 further comprising:

second ensuring means for ensuring smooth relative rotation between said plane surface of said first cylindrical means and said plane surface of said second cylindrical means.

11. A device according to claim 10 further comprising:

driving means for rotating said first cylindrical means releative to said second cylindrical means, said driving means including a rotatably driven portion arranged in said plane surface of said first cylindrical means and a driving portion arranged in said plane surface of said second cylindrical means.

12. A device according to claim 11 further comprising:

transferring means for transferring an electrical signal between said first cylindrical means and said second cylindrical means and including a first part arranged in said plane surface of said first cylindrical means and a second part arranged in said plane surface of said second cylindrical means.

13. A device according to claim 8 wherein said ensuring means includes one or more grooves formed on at least one of said outer circumferential surface of said second cylindrical part of said first cylindrical means and the inner circumferential surface of said second cylindrical means.

* * * * *